July 31, 1934. J. A. WEAVER 1,968,111
WINDSHIELD HEATER
Filed Dec. 18, 1933

Inventor
John A. Weaver.
By A. J. O'Brien
Attorney

Patented July 31, 1934

1,968,111

UNITED STATES PATENT OFFICE 1,968,111

WINDSHIELD HEATER

John A. Weaver, Greeley, Colo.

Application December 18, 1933, Serial No. 702,933

3 Claims. (Cl. 20—40.5)

This invention relates to improvements in devices for defrosting and heating windshields of automobiles.

Drivers of automobiles all know that during the winter when the weather is cold and the windows are closed, the inside of the windshield frequently frosts over so as to make it opaque or nearly so, and when this occurs, it is necessary to stop the car and let the windshield clear and if this frosting is to be prevented, the windows must be left partly open, which renders the car cold and uncomfortable. During snow storms, snow and sleet also accumulate outside of the windshield and even where automatic windshield wipers are provided, the accumulation often exceeds the capacity of the wiper with the result that the windshield becomes covered with snow and ice to such an extent that operation of the car cannot safely be continued.

It is the object of this invention to produce a simple and reliable device which can be readily put into operative position and which will prevent a portion of the windshield in front of the driver from frosting during exceedingly cold weather and which will also assist in preventing accumulations of ice and snow during winter storms.

The engine of an automobile, is, as is well known, enclosed in a compartment whose sides and top are formed by sheet metal members which are referred to as the engine hood. At the front of the engine the radiator is located and between the engine and the radiator, a fan is located which, when the engine is in operation, produces a strong current of air from the front of the engine towards the rear thereof. This current of air serves to cool the engine and will itself become quite hot.

This invention, briefly described, relates to a means for directing a portion of the warm air that passes between the engine and the engine hood onto the outside of the windshield directly in front of the driver. The warm air impinging on the windshield heats the same sufficiently to prevent frosting from taking place on the inside and will also produce sufficient heat to prevent the accumulation of ice and snow on the outside of the windshield.

In order to describe the invention most clearly, so that it can be readily understood, reference will be had to the accompanying drawing in which it has been illustrated in its preferred form, and in which.

Figure 4:
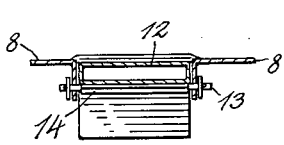
Fig. 4 is a section taken on line 4—4, Fig. 3.
Figure 1:
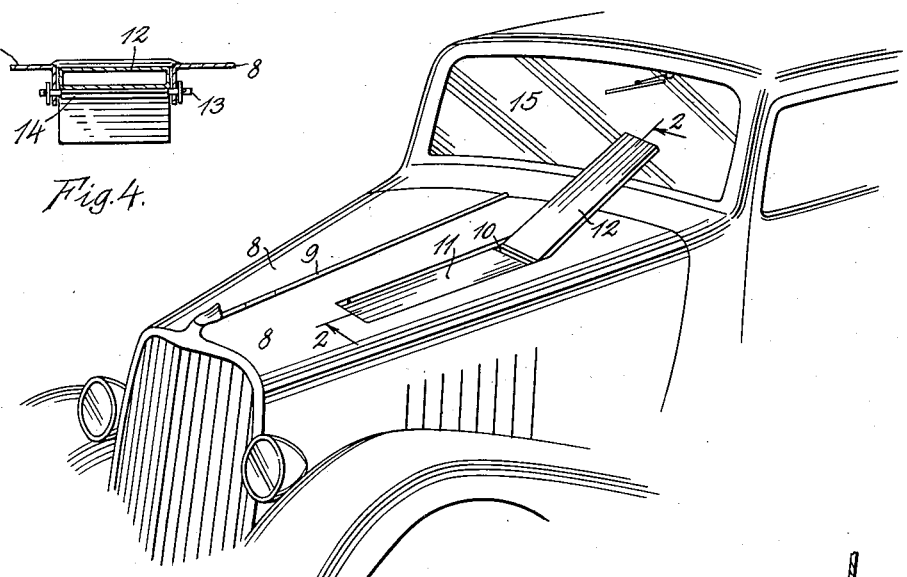
Fig. 1 is a perspective view of the front end of an automobile showing the conduit or pipe, which directs the air to the windshield, in operative position.
Figure 5:
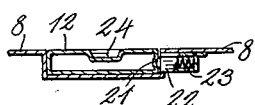
Fig. 5 is a section taken on line 5—5, Fig. 3.
Figure 2:
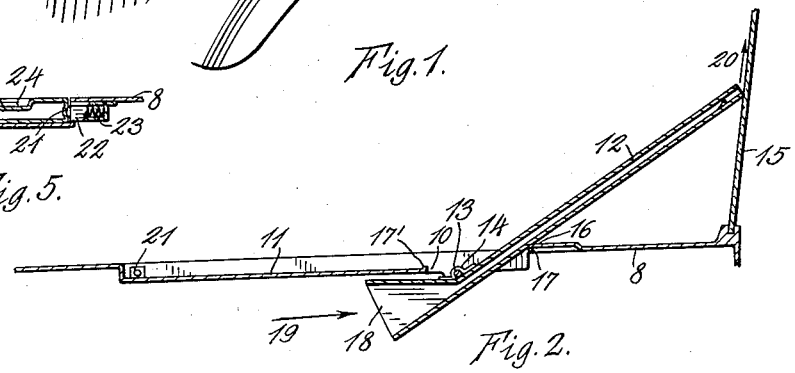
Fig. 2 is a section taken on line 2—2, Fig. 1.
Figure 3:
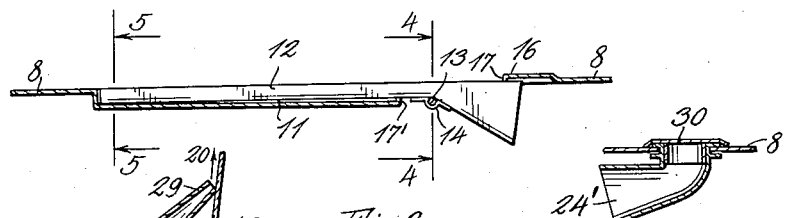
Fig. 3 is a section similar to that shown in Fig. 2, and shows the conduit or pipe in inoperatve position, the pipe being shown in side elevation.

In the drawing reference numeral 8 indicates one part of the engine hood and this part is formed from sheet metal, there being a corresponding member on the other side and the two members being connected by means of a hinge 9. The hood member on the left of the automobile, as referred to the driver, is provided with a transverse opening 10 and extending forwardly from this opening is a depression 11. The width of the depression 11 is substantially the same as the length of the opening 10 and the depth is the same or approximately the same as the thickness of the conduit or pipe 12. Pipe 12 may be formed from sheet metal and is of rectangular cross section as shown more particularly in Figs. 4 and 5. This pipe extends through the opening 10 and is connected with the hood member by means of a pivot pin 13. This pin is secured to the pipe by means of straps 14, or by some other equivalent means. The length of the pipe from the pivot pin 13 to its upper end is such that when it is rotated into the position shown in Fig. 2, its end will terminate adjacent the front surface of the windshield 15. The pipe preferably rests on the corner 16 of the material directly to the rear of the opening and the front edge of this material is preferably bent downwardly as indicated by reference numeral 17. The bottom of the recess 11 is also provided with an upwardly extending flange 17', which corresponds to 17 at the rear. The lower end of the pipe is flared outwardly or formed into what may be termed a funnel shape so as to provide an enlarged opening 18 which is directed forwardly when the pipe is in the position shown in Fig. 2. When the engine and the fan are operating, air will move through the space between the engine and the inside of the hood in the direction indicated by arrow 19 in Fig. 2 and a portion of this air will enter the opening 18 and flow upwardly through the tube and emerge at its upper end as indicated by arrow 20 and this hot air impinging upon the windshield will raise its temperature sufficiently to prevent frost from forming on the inside, or snow or sleet from adhering to its outer surface. When the weather is nice, it is evident that the heating of the windshield is not necessary and the pipe 12 is therefore rotated into the position shown in Figs. 3, 4 and 5. It will be seen that the thickness of the pipe is substantially the same as the depth of the recess and therefore when it is in operative position, the upper surface of the pipe is flush with the sides of the hood in the manner shown in Fig. 5. In order to prevent the pipe from rattling and becoming loose, a detent has been provided. This detent consists of a ball 21 that is held in a tube 22 and acted upon by a compression spring 23. The side of the pipe is provided with a small indentation as shown in Fig. 5 and the ball 21 enters this and serves to hold the pipe in inoperative position. When the pipe is to be moved upwardly into operative position, a finger is inserted into the recess 24, which has an undercut wall, and sufficient force exerted to release it from the detent, after which it can be rotated into the position shown in Fig. 1. In the drawing the pipe has been shown as of rectangular cross section, but this is not essential to successful operation and it may be possible to use other shapes, but in any case the upper surface of the pipe when in inoperative position should be of such shape that it will form an extension of the upper surface of the hood member as shown in Figs. 4 and 5.

When the construction just described is used, it is essential to provide a recess in the upper surface of the hood member on the left side of the automobile and this can preferably be done at the factory. It is, of course, possible, to change any hood member by cutting out a portion corresponding to the recess and then securing a pan underneath, but this recess should preferably be formed by suitable dies so as to obviate the necessity of making joints.

Figure 7:
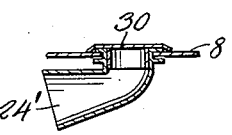
Fig. 7 is a section similar to that shown in Fig. 6, but with the pipe removed and the opening closed by means of a suitable cover.
Figure 6:
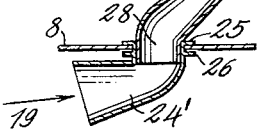
Fig. 6 is a longitudinal section showing a slightly modified form of the invention with the parts in operative position.

For the purpose of converting cars already built, a slightly modified form may be employed and this has been shown in a more or less diagrammatic manner in Figs. 6 and 7. In Fig. 6, a funnel like member 24' is secured to an opening by means of flanges 25 and 26, which can be crimped about the edge of the opening and in order to conduct the hot air from the funnel to the windshield, a tapering tube 27 is provided. The lower end of this tube which has been designated by reference numeral 28, is of the proper size to fit into the opening in the funnel and the length is calculated so that when in position, its upper end which has been designated by reference numeral 29, terminates adjacent the windshield, and is preferably transversely flattened. When the engine and the fan are operating, air will enter in the direction of arrow 19 and leave in the direction of arrow 20, the same as in Fig. 2. When the weather is nice and the device is not needed, the pipe 27 can be removed and the opening closed by means of a plate 30 as shown in Fig. 7. The object of having flanges 17 and 17' is to make it possible to form a tight joint between the upper and lower surfaces of the pipe 12 and the edges of these flanges in the manner shown in Fig. 3. The flanges 17 and 17' are so positioned that the material must flex slightly when the pipe is in inoperative position, and therefore a fairly tight joint is formed which prevents water from entering under the hood in an ordinary rain. The detent 21 resists the turning action of the force exerted by the flanges 17 and 17'.

From the above description it will be seen that by means of the simple expedient shown and described, that portion of the windshield directly in front of the driver can be kept free from frost, snow and ice during cold and stormy days and thus make driving safe, whereas without this heating attachment, conditions will soon arise which make it positively dangerous to operate the car and which necessitate constantly stopping for the purpose of cleaning the windshield when there is a storm and which make it necessary to operate the car with the windows open during extremely cold weather.

Having described the invention what I claim as new is:

1. In an automobile having an engine, and an engine hood forming a cover over the same, the hood having an opening and a depressed area in its upper surface, said depressed area extending forwardly from the opening, a pipe extending through the opening, the thickness of the pipe being substantially equal to the depth of the depressed area whereby when it is folded into the depressed area the top of the pipe will be substantially flush with the surface of the hood on opposite sides of the depression.

2. A hood member forming part of a cover for an automobile engine, comprising a sheet of metal of the proper size and shape, and provided with an elongated opening extending in a transverse direction relative to the automobile, there being a depression in the upper surface of hood member, the width of the depression being equal to the length of the opening, a substantially rectangular pipe extending through the opening, the width of the pipe being substantially equal to the width of the recess and the thickness substantially equal to the depth of the depression, a pivot pin extending transversely of the recess adjacent one edge of the opening, means for hingedly connecting the pipe with the pin and a latching means for holding the pipe in the depression.

3. In an automobile having an engine, a hood enclosing the engine, a windshield and a fan for producing air currents that flow over the engine in the direction of the windshield, the hood having an opening, means for conveying air from within the hood to a point adjacent the outer surface of the windshield and directing it against the latter, said means comprising a pipe that extends through the opening in the hood, a hinged connection between the pipe and the hood whereby it can be turned into a position in which its outer end terminates adjacent the front surface of the windshield and in which the inner end opens towards the fan whereby air will flow through the pipe and be discharged onto the windshield and whereby it can be turned into inoperative position with its outer end pointing towards the fan.

JOHN A. WEAVER.